United States Patent
Kondoh et al.

(10) Patent No.: US 7,003,651 B2
(45) Date of Patent: Feb. 21, 2006

(54) PROGRAM COUNTER (PC) RELATIVE ADDRESSING MODE WITH FAST DISPLACEMENT

(75) Inventors: Yuki Kondoh, Kokubunji (JP); Osamu Nishii, Inagi (JP)

(73) Assignee: Renesas Technology Corporation, Tokyo (JP)

( * ) Notice: Subject to any disclaimer, the term of this patent is extended or adjusted under 35 U.S.C. 154(b) by 518 days.

(21) Appl. No.: 10/017,198

(22) Filed: Dec. 18, 2001

(65) Prior Publication Data

US 2002/0108029 A1    Aug. 8, 2002

(30) Foreign Application Priority Data

Feb. 2, 2001    (JP)   ............... 2001-026253

(51) Int. Cl.
    *G06F 9/32*    (2006.01)
(52) U.S. Cl. ...................... 712/239; 712/230
(58) Field of Classification Search ............... 712/213, 712/239, 230
    See application file for complete search history.

(56) References Cited

U.S. PATENT DOCUMENTS 5,608,886 A * 3/1997 Blomgren et al. .......... 712/239
6,044,455 A * 3/2000 Hara ........................ 712/213
6,237,087 B1 * 5/2001 O'Connor ................... 712/226
6,243,805 B1 * 6/2001 Mahurin .................... 712/233
6,502,185 B1 * 12/2002 Keller et al. .............. 712/213

OTHER PUBLICATIONS

SuperH™ RISC Engine SH-4, Programming Manual, Hitachi, Ltd. Apr. 19, 2001, pp. 199, 10-22.
Linley Gwennap, "MAJC Gives VLIW a New Twist", Microdesign Resources, Sep. 13, 1999; Microprocessor Report, pp. 12-15, 22.

* cited by examiner

*Primary Examiner*—Eric Coleman
(74) *Attorney, Agent, or Firm*—Reed Smith LLP; Stanley P. Fisher, Esq.; Juan Carlos A. Marquez, Esq.

(57) ABSTRACT

The invention allows the execution of a PC relative branch instruction with displacement is speeded up without changing the instruction operations of existing processors and without requiring new instructions. The branch target address calculation is made faster by calculating the lower portion of the branch target address prior to storing the instruction word in a cache or buffer, and writing the calculation result into the displacement field of the instruction word and into a bit that has been added to the cache or the buffer, such that some calculation is executed simultaneously to be skipped later at the time of execution of the instruction by using the executed calculation result stored in the cache or buffer.

7 Claims, 6 Drawing Sheets

| | (a) | 1 | 1 | 1 | 1 | 0 | 0 | 0 | 0 |
|---|---|---|---|---|---|---|---|---|---|
| INPUT | (b) | 1 | 1 | 0 | 0 | 1 | 1 | 0 | 0 |
| | (c) | 1 | 0 | 1 | 0 | 1 | 0 | 1 | 0 |
| OUTPUT | OUTPUT OF SELECTOR 823 | SELECT PCh | SELECT PCh | SELECT PCh+1 | SELECT PCh | SELECT PCh | SELECT PCh-1 | SELECT PCh | SELECT PCh |

PROGRAM COUNTER (PC) RELATIVE ADDRESSING MODE WITH FAST DISPLACEMENT

FIELD OF THE INVENTION

The present invention relates to a processor used as a CPU (Central Processing Unit) in a computer, more particularly to a processor for converting a program counter relative displacement value into a semi-ABS displacement value.

BACKGROUND OF THE INVENTION

There are known processors having branch instructions for determining branch target address values by calculating the sum of a register value in the processor and a constant value (referred to as an "immediate value") included in an instruction word at an execution time. In particular, when the register is the program counter (PC), which indicates the address of the instruction currently being executed (i.e. program counter (PC) address), the target location is relative to the location of the branch instruction. This type of branch instruction is employed in many processors because it enables branches to jump a fixed location in the program regardless of the address placement of the program. In this case, the immediate value in the instruction word of the branch instruction is referred to as a displacement (abbreviated "disp"), and the branch instruction is called a program counter (PC) relative branch instruction with displacement (abbreviated as a "PC+disp branch instruction" below). One example of this type of branch instruction is the BRA instruction described on pages 10 to 22 of "The SH7750 Programming Manual" published by Hitachi Ltd. in 1998.

A PC+disp branch instruction is executed in a two-step operation: (1) determining the branch target address, in many cases by performing a sign extension of the disp to align it with the bit-width of the program counter and then calculating the sum of the value of the PC and the sign-extended disp; and (2) fetching an instruction by using the branch target address. The sign extension refers to a process of converting a signed binary integer with a width of m bits to a signed binary integer with a width of n (>m) bits, which can be implemented by copying the source integer to the lower m bits of the target integer, and copying the most significant bit of the source integer, or sign bit, to each of the upper n-m bits of the target integer. An example of the address calculation (1) above will now be shown in FIG. 1.

Figure 1:
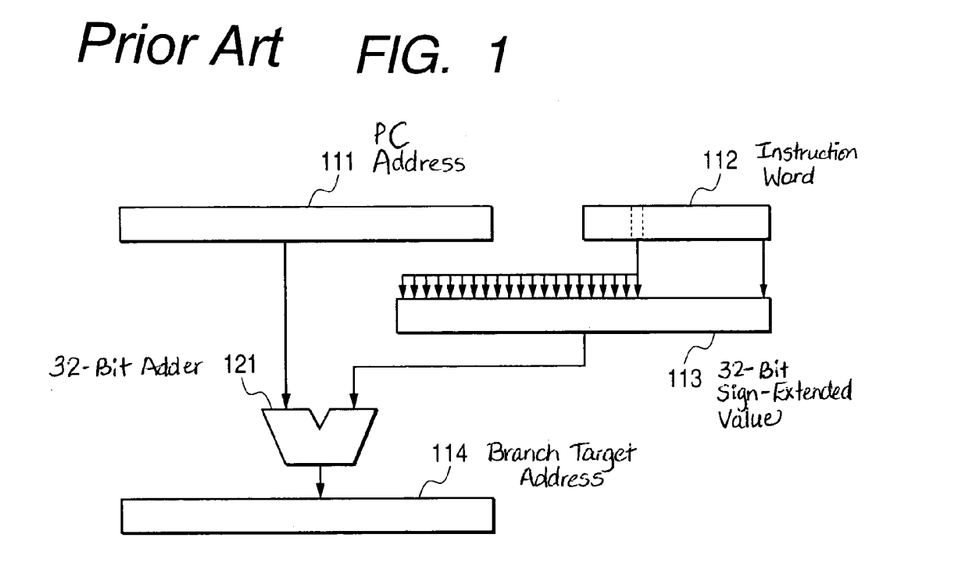
FIG. 1 shows a method of calculating branch target addresses with a conventional PC+disp branch instruction.
Figure 2:
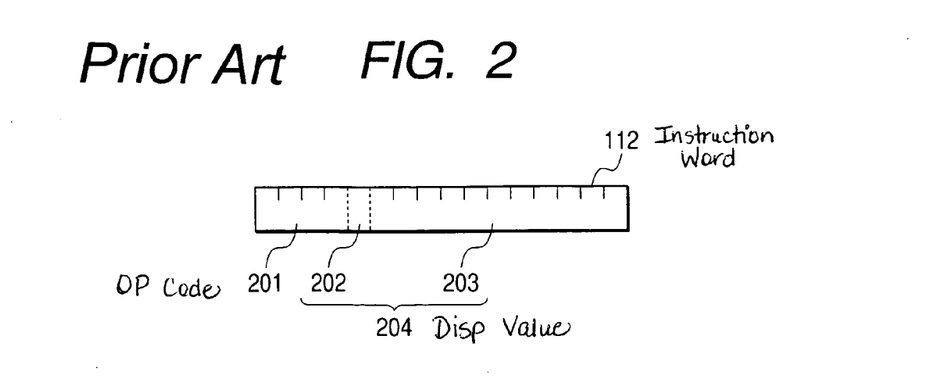
FIG. 2 shows the format of an instruction word 112 used in the method in FIG. 1.

Reference numeral 111 indicates the 32-bit address of the instruction being executed, i.e., the value of the PC. Reference numeral 112 indicates the instruction word of a PC+disp branch instruction with the lower 12 bits representing the disp. The format of the instruction word 112 is shown in FIG. 2. Reference numeral 201 indicates the instruction op code. The instruction op code for a PC+disp branch instruction is 4 bits long. Reference numerals 202 and 203 indicate portions of the disp, namely, the highest 1 bit and lower 11 bits within the displacement, respectively. Reference numeral 204 indicates the 12-bit signed disp, consisting of the highest 1 bit 202 and the lower 11 bits 203. That is, the highest 1 bit 202 of the disp is the sign bit of the disp.

The branch target address 114 is obtained in a 32-bit adder 121 by calculating the sum of the address 111 and a value 113 obtained by sign-extending the disp value 204 in the instruction word 112 to 32 bits.

A PC+disp branch instruction intrinsically requires an n-bit addition operation for calculating the branch target address. An n-bit addition operation requires time of the order of logn, and this addition operation time has been considered to be inevitable in prior processors.

Figure 3:
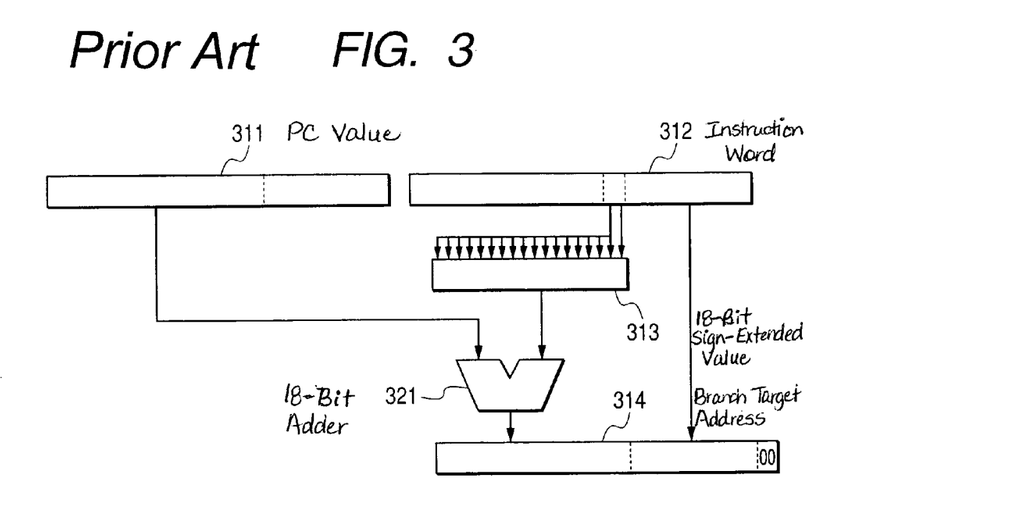
FIG. 3 shows a method of calculating branch target addresses in a conventional SemiABS branch instruction.

According to the description on pages 12 to 15 and 22 of "MICROPROCESSOR REPORT" published on Sep. 13, 1999, 'Sun Micro Systems', MAJC architecture has adopted a semi-absolute branch (abbreviated as "SemiABS branch" below) instruction rather than a PC+disp branch instruction to reduce the addition operation time mentioned above. A SemiABS branch instruction specifies some of address bits as an absolute address. FIG. 3 shows the address calculation method of a SemiABS branch instruction.

Figure 4:
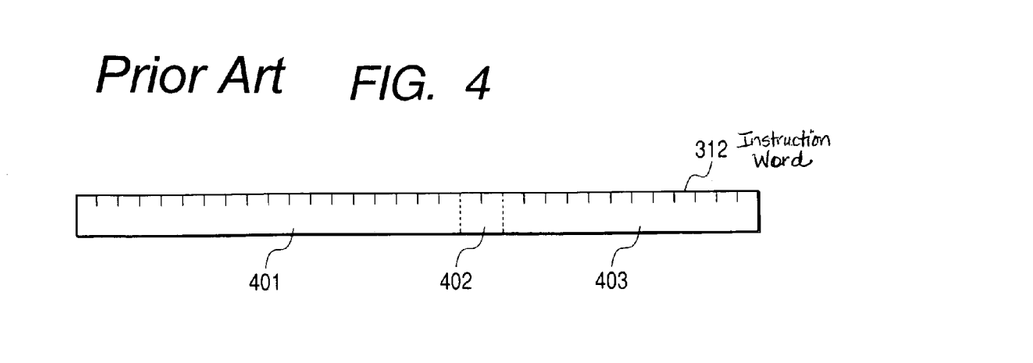
FIG. 4 shows the format of an instruction word 312.

Reference numeral 311 indicates the PC value as in the case of a PC+disp branch instruction. Reference numeral 312 indicates the instruction word of a SemiABS branch instruction. FIG. 4 shows the instruction format of a Semi-ABS branch instruction. Reference numeral 401 indicates an operand field which is additional to the operand fields for the instruction op code and branch target address calculation. Reference numerals 402 and 403 indicate operand fields used for branch target address calculation. The lower 12-bit portion in the instruction word 312 represents operand 403, and the next upper 2-bit portion represents operand 402.

In the calculation of the branch target address 314, the lowest 2 bits are set to "00" (a constant value), and the next 12-bit to the lowest 2 bits portion accommodates operand portion 403 in the instruction word 312 is set as is. For the next 18-bit portion, the sum of the 18-bit sign-extended value 313 of operand portion 402 in the instruction word 312 and the PC value 311 is calculated in an 18-bit adder 321 and outputted.

A SemiABS branch requires an adder with fewer digits for branch target address calculation than in the case of a PC+disp branch, so the delay time can be reduced accordingly, and higher operating frequencies can be expected.

Especially in a processor having an instruction cache, a SemiABS branch allows faster processing. The execution of a branch instruction requires access to the instruction cache after the branch target address calculation, and ordinary cache operations are performed in two steps: (1) inputting the index portion of an address to the cache array and reading a corresponding tag portion and data from it, and (2) comparing the tag portion output in (1) with a portion of the address corresponding to the tag portion, and outputting the data as a cache hit if these portions match. That is, input of the index portion to the cache has to precede the timing of the input of the tag portion. In addition, the index portion of an address is usually placed in the lower portion of the address.

A SemiABS branch outputs the lower portion of the branch target address as is without performing addition. When the bit range of the index portion is included in the bit range that is not submitted to the addition operation, access to the cache array can start without waiting for the completion of the calculation of the upper portion of the branch target address. This speeds up the execution of the branch instruction as a whole.

The prior art described above has introduced a new SemiABS branch to implement a fast branch in place of the PC+disp branch. However, a new processor adopting the SemiABS branch logic system cannot execute programs written with non-SemiABS branch instructions. That is, object code that runs on a processor having existing PC+disp branch instructions contains no SemiABS branch instructions which accordingly cannot benefit from the faster performance.

In addition, a SemiABS branch makes it necessary to specify portion of a branch target address as an absolute address, which makes it impossible to determine whether the address is within the range of the branch target address at compile time, and that compiled object code is not relocatable. The term "relocatable" refers to a state in which object code is executable regardless of its address location.

SUMMARY OF THE INVENTION

One of the objects of the present invention is to speed up the operation of a PC+disp branch instruction without creating a new instruction set for a processor or adding extra instructions to an existing instruction set. The existing PC+disp branch instructions do not have to be deleted. Consequently, the problems described above will not arise.

To attain this object, the present invention temporarily stores instruction words in a storage area, such as a cache or a buffer, and takes out the temporarily stored instruction words at execution time for use in a processor.

The present invention determines whether an instruction word is a PC+disp addressing instruction when storing it in the storage area. If it is a PC+disp addressing instruction, the invention carries out the lower portion of the PC+disp calculation before storing the instruction in the storage area, writing the calculation result into the disp field of the instruction word and into bits that have been added to the storage area. When the PC+disp addressing instruction is read from the storage area for execution, the result of the lower digit portion of the PC+disp calculation is outputted as is and the calculation of the lower address portion is skipped, whereby the time for address calculation of the PC+disp branch instruction is reduced. This is one example of the present invention.

According to one aspect of the invention, a processor comprises an instruction fetching circuit for calculating a lower portion of an effective address for an instruction word with a displacement, for replacing a value of the displacement in the instruction word according to the calculating result, and for storing the value in a storage circuit, and the storage circuit for temporarily storing the instruction word, from which the stored instruction word is read at an instruction execution time. While the effective address of the instruction word in the storage circuit is specified relative to a current value of a program counter address at the instruction execution time with the displacement, and the processor utilizes the value stored in the storage as a lower portion of the effective address at the instruction execution time.

The storage circuit may have additional storage areas each of which one-on-one corresponds to each the instruction word, and the storage circuit stores the calculating result in the additional storage areas. The effective address may be a branch target address, and the storage circuit may be a cache or a buffer.

According to another aspect of the invention, a processor comprises a storage circuit for temporarily storing an instruction word, from which the stored instruction word is read at an instruction execution time; a decoder for receiving the instruction word and for determining whether an effective address of the instruction word is specified as a PC relative displacement value; an adder for adding of the PC relative displacement value and predetermined lower bits of the PC address, and for outputting the calculating result as a portion of the effective address if the instruction word has the PC relative displacement value; and a selector for replacing the displacement value in the instruction word with the calculating result outputted from the adder, and for outputting the replaced result to the storage circuit as a semiABS displacement value of the instruction, if the instruction word has the PC relative displacement value.

The processor may further comprises an effective address calculator for receiving a portion of the instruction word that has been stored in the storage circuit, for performing a sign bit extension thereof, and for calculating the effective address by using the semiABS displacement value at the instruction execution time. The storage circuit includes an area for storing a carry bit from the adder corresponding to the instruction word.

The processor may further comprises an effective address calculator for receiving a portion of the instruction word that has been stored in the storage circuit, for performing a sign bit extension thereof, and for calculating the effective address with the semiABS displacement value at the instruction execution time, while the effective address calculator calculates the effective address with the sign bit extension by using the carry bit stored in the storage circuit. The storage circuit may be an instruction cache.

In addition, the processor may further comprises an effective address calculator for calculating the effective address with the semiABS displacement value at the instruction execution time; and a carry bit recovering means for recovering the disregarded carry bit of the adder The carry bit recovering means includes a comparator for comparing the semiABS displacement value and lower bits of the PC address; a decoder for receiving the comparing result, a sign_bit of the semiABS displacement value, and a bit which is a digit higher than the highest bit of the lower bits of the PC address in the PC address thereby outputting a selecting signal for selecting one of +1, 0, and −1 according to a predetermined conversion table; and means for adding +1, 0, or −1 to the rest bits of the PC address then to a upper portion of the effective address with a bit number equal to the rest bits of the PC address according to the selecting signal thereby deciding a recovered carry bit, while the effective address calculator calculates the effective address without using the carry bit generated by the adder.

According to another aspect of the invention, a method for converting a first instruction word with a PC relative displacement value into a second instruction word with a semiABS displacement value, comprises calculating a the semiABS displacement value by adding predetermined lower bits of a PC address and the PC relative displacement value; replacing the PC relative displacement value in the first instruction word with the calculating result; and storing the second instruction word with the semiABS displacement value in a storage circuit. While the semiABS displacement value stored in the storage circuit is then immediately used as a portion of an effective address at the instruction execution time.

The method further comprises receiving a portion of the instruction word stored in the storage circuit; performing a sign bit extension without using a carry bit carried from the adding result; and calculating the effective address with the semiABS displacement value at the instruction execution time.

According to another aspect of the invention, a method for recovering a disregarded carry bit generated during the above-mentioned method, includes comparing the semiABS displacement value and lower bits of the PC address; receiving the comparing result, a sign bit of the semiABS displacement value, and a bit which is a digit higher than the highest hit of the lower bits of the PC address in the PC address thereby outputting a selecting signal for selecting one of +1, 0, and −1 according to a predetermined conversion table; and adding +1, 0, or −1 to the rest bits of the PC address then to a upper portion of the effective address with a bit number equal to the rest bits of the PC address according to the selecting signal thereby recovering a carry bit carried from the most significant bit of the add step.

Alternatively, the method for recovering a disregarded carry bit includes comparing the semiABS displacement value and lower bits of the PC address to obtain a carry bit carried from the adding step; performing an exclusive OR operation on the carry bit, a sign bit of the semiABS displacement value, and the bit which is a digit higher than the highest hit of the lower bits of the PC address in the PC address thereby outputting a sign bit of the PC relative displacement value of the first instruction word; and adding the carry bit, the sign bit, and the bit which is a digit higher than the highest hit of the lower bits of the PC address in the PC address to recover a carry bit carried from the adding step.

Other and further objects, features and advantages of the invention will appear more fully from the following description.

BRIEF DESCRIPTION OF THE DRAWINGS

The preferred embodiments of the present invention are illustrated in the accompanying drawings in which.

DETAILED DESCRIPTION OF THE PREFERRED EMBODIMENTS

The preferred embodiments of the present invention will be shown below.

First Embodiment

Figure 5:
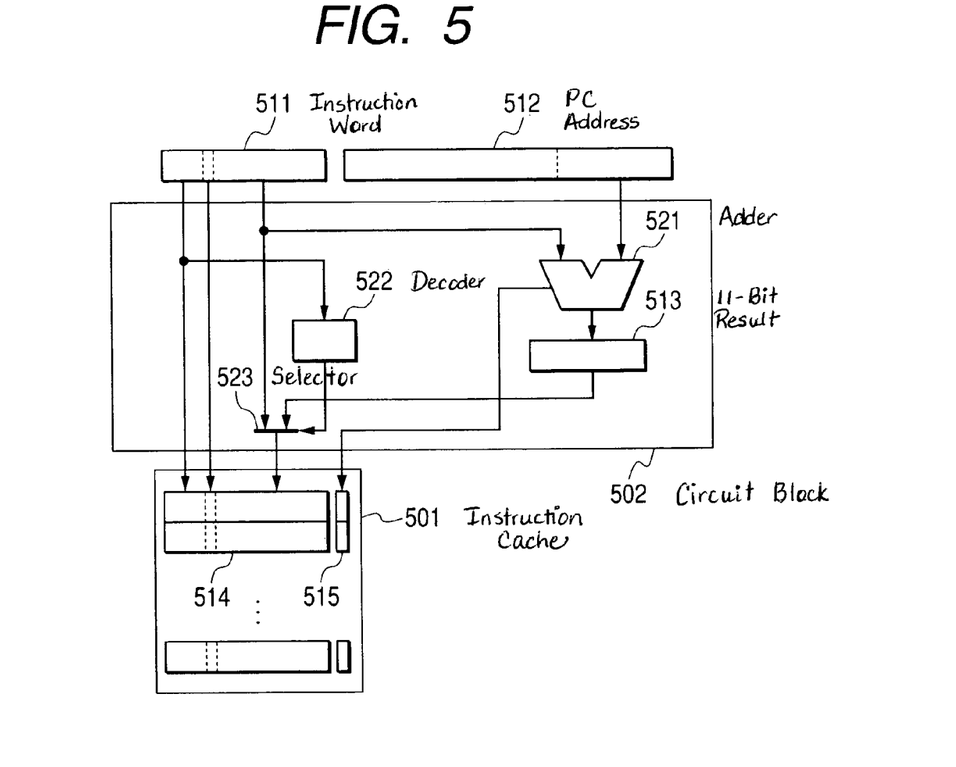
FIG. 5 shows a processing diagram at a time of storing an instruction word in an instruction cache in the first embodiment of the present invention.
Figure 6:
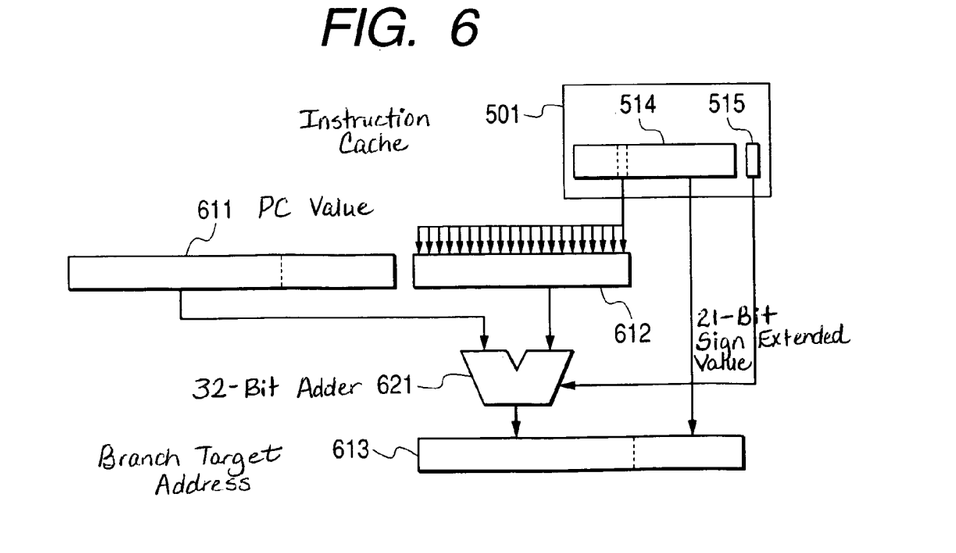
FIG. 6 shows an address calculation diagram at a time of execution of a PC+disp branch instruction in the first embodiment of the present invention.

FIG. 5 and FIG. 6 show the simplest exemplary implementation of the present invention. FIG. 5 shows an instruction fetching processing, in which an instruction word is read from a main memory and is stored in an instruction cache. Reference numeral 511 indicates an instruction word that has been read from the main memory which the instruction format is the same as the one shown with reference numeral 112 in FIG. 2. The processor of this embodiment uses 32-bit addressing. Reference numeral 512 indicates the address on main memory at which the instruction is stored, and the instruction width being 32 bits. The address 512 equals to the value of the PC at the execution time of the instruction word 511, namely, the PC address.

Reference numeral 501 indicates an instruction cache. Reference numeral 514 indicates an entry having the same width as that of the instruction word 511. There are a plurality of entries within the instruction cache 501. Reference numeral 515 indicates a field that is in a one-on-one relationship with the entry field 514, but its width is 1 bit. A circuit block 502 receives input of the instruction word 511 and the PC address 512, then generates an output that is stored in fields 514 and 515 in the instruction cache 501.

The operation of the circuit block 502 is described as follows. The op code 201 and bit 202 in the instruction word 511 are stored in the corresponding portions of entry 514 in the instruction cache 501 without alteration. Reference numeral 522 indicates a decoder, which determines whether the op code 201 in the instruction word 511 is a PC+disp branch instruction and switches the output of a selector 523. If the op code 201 in the instruction word 511 is an instruction other than a PC+disp branch instruction, the selector 523 outputs the lower bits 203 in the instruction word 511 as is, then these bits are stored in the corresponding portion of entry 514 within the instruction cache 501 without alteration.

If the op code 201 in the instruction word 511 indicates a PC+disp branch instruction, the lower bits in the instruction word 511 (equivalent to 203) and the lower 11-bit portion of the address 512 are summed in an adder 521 as an 11-bit result 513, and the selector 523 outputs the 11-bit result 513. This result is stored in the portion corresponding to the lower bits 203 in entry 514 in the instruction cache 501. The carry bit, i.e. the uppermost bit of the addition result executed by the adder 521 is stored in field 515.

FIG. 6 shows the branch target address calculation unit at the execution time of a PC+disp branch instruction. Reference numeral 611 indicates the PC relative offset value (i.e. the PC address), which is used together with the value of entry 514 and field 515 that have been stored in the instruction cache 501 to determine a branch target address 613. The portion corresponding to the lower bits 203 in the entry 514 is output to the lower 11-bit portion of the branch target address 613 as is. Reference numeral 612 indicates a portion that corresponds to bit 202 within entry 514 has been sign-extended to 21 bits. An adder 621 calculates the sum of portion 612 and the upper 21-bit portion of the PC value 611 and outputs the result to the upper 21-bit portion of the branch target address 613.

The circuit block 502 shown in FIG. 5 calculates the sum of the lower 11-bit portion of the disp and the lower 11-bit portion of the PC address then stores the carry bits outputted from the lower portion in field 515. At the execution time of the PC+disp branch instruction shown in FIG. 6, the sum of the upper 1 bit of the disp, which has been sign-extended to 21-bits, and the upper 21-bit portion of the PC is calculated in consideration of the carry bit output from the lower portion, which has been stored in field 515. That is, the branch target address 613 has been calculated by sign-extending the 12-bit disp to 32 bits and calculating the sum of the resultant value and the Pc relative offset value.

Second Embodiment

Figure 7:
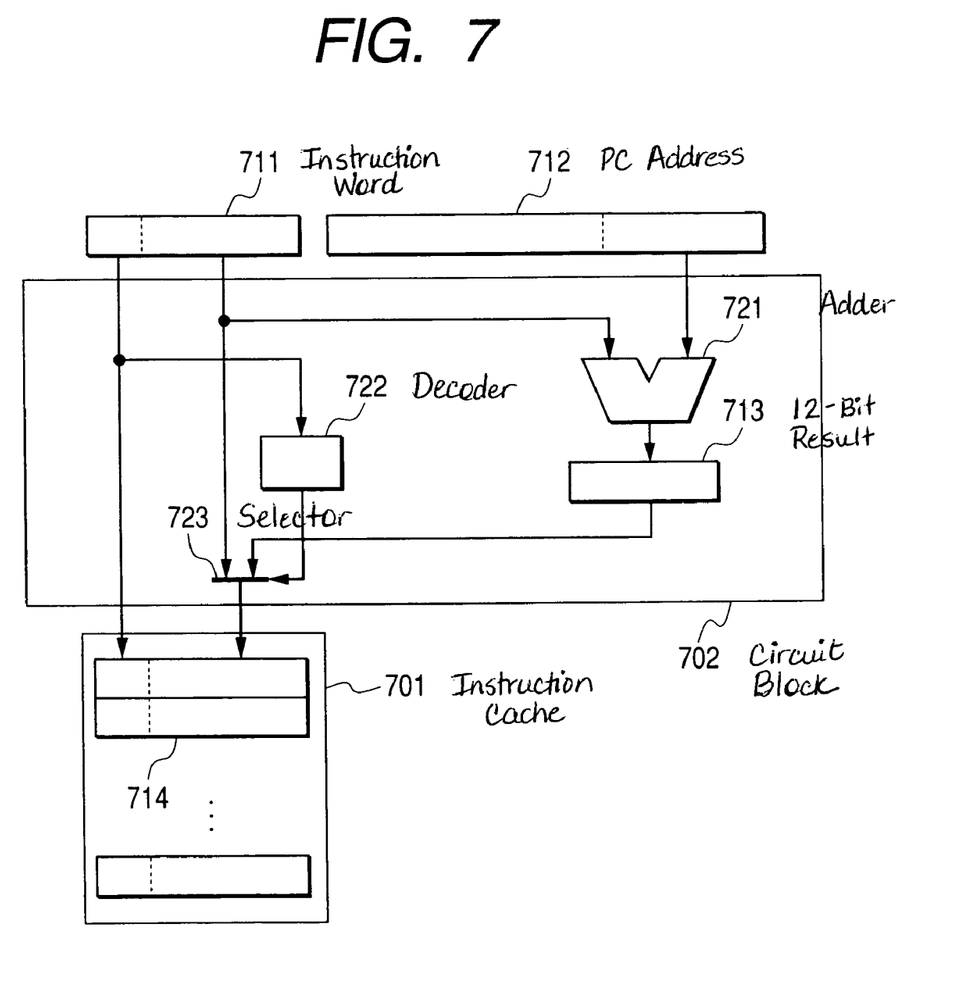
FIG. 7 shows a processing diagram at a time of storing an instruction word in an instruction cache in the second embodiment of the present invention.
Figure 8:
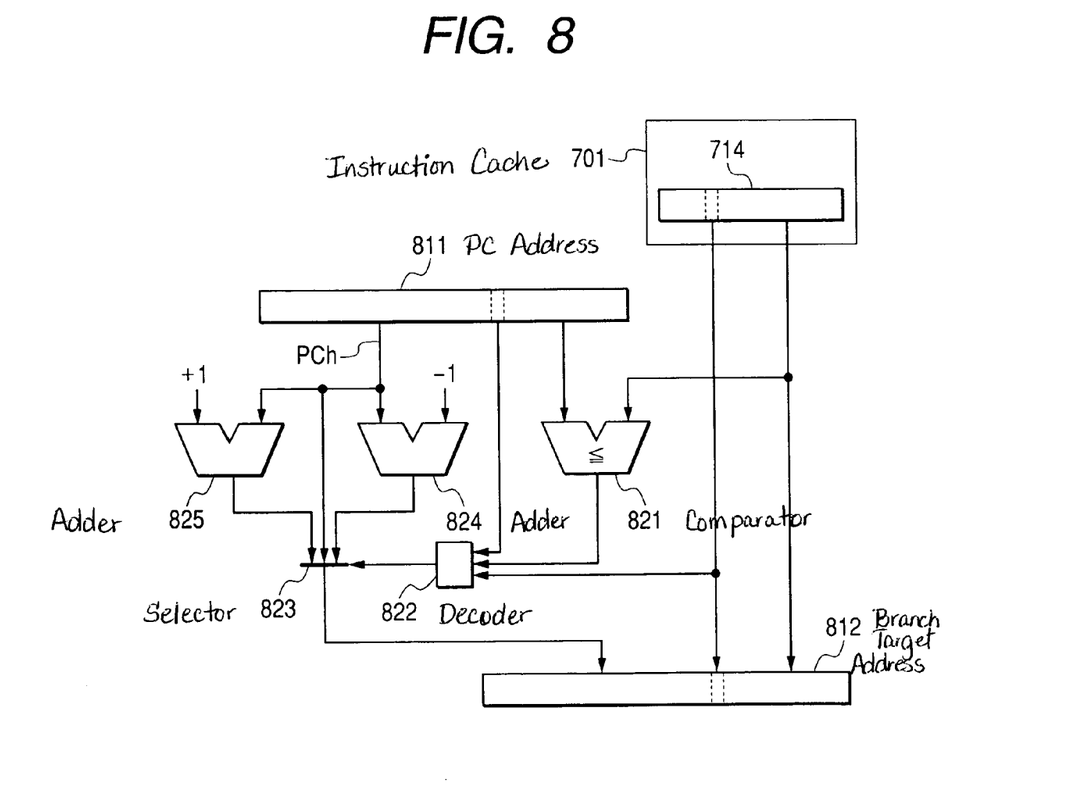
FIG. 8 shows an address calculation diagram at a time of execution of a PC+disp branch instruction in the second embodiment of the present invention.

FIG. 7 and FIG. 8 show another embodiment of the present invention. FIG. 7 shows an instruction fetching processing equivalent to that in FIG. 5 of the first embodiment. Reference numerals 701, 711, 712, and 714 correspond to reference numerals 501, 511, 512, and 514, and circuit block 702 corresponds to circuit block 502 in the first embodiment. There is no portion in this embodiment corresponding to field 515 in the first embodiment. In other words, the carry bit carried from the adder in the first embodiment in FIG. 5 is not available here.

The operation of the decoder 722 and the selector 723 is almost the same as the operation of the decoder 522 and the selector 523 in the first embodiment. If the op code 201 in the instruction word 711 indicates a PC+disp branch instruction, a sum 713 is outputted from an adder 721 to a portion corresponding to the 12-bit disp 204 in an entry 714 in the instruction cache 701. If the instruction word 711 is not specified relatively to a PC, the 12 bits 204 in the instruction word 711 are directly passed onto the corresponding portion of entry 714. The adder 721 calculates the sum of the 12 bits 204 in the instruction word 711 and the lower 12 bits of the address 712 then outputs the 12-bit result 713.

FIG. 8 shows the branch target address calculation unit at the execution time of a PC+disp branch instruction, as in FIG. 6 of the first embodiment. Reference numeral 811 indicates the PC address, the value of which is used together with the value of an entry 714 stored in the instruction cache 701 to determine a branch target address 812, i.e. an effective address. The portion corresponding to the displacement 204 within the entry 714 is passed on "as is" to a predetermined number of lower bits, such as the lower 12-bit portion, of the branch target address 812.

Reference numerals 824 and 825 denote two adders, which output the values calculated by adding +1 and −1 to the value of the rest of the bits of the PC address, such as the upper 20 bits of the PC address 811, respectively. That is, a selector 823 outputs one of the values determined by adding +1, ±0, or −1 to the upper 20 bits of the PC address 811 to the upper 20-bit portion of the branch target address 812 according to the output of a decoder 822.

Figure 10:
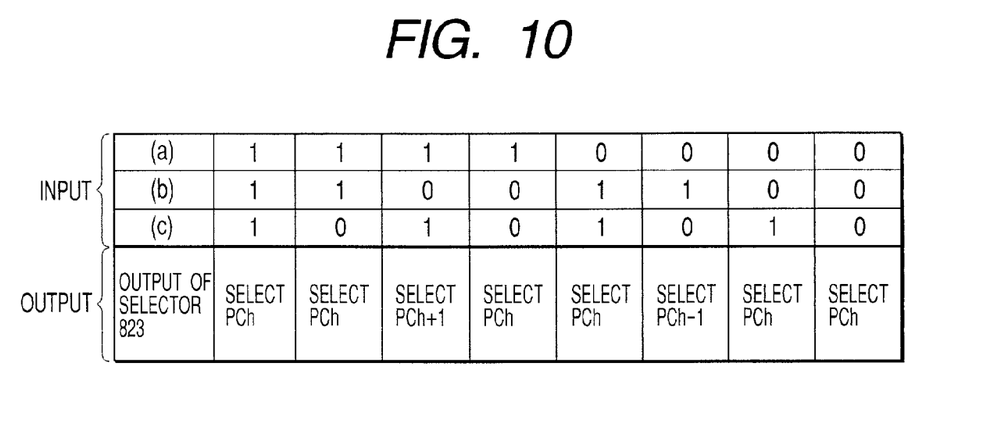
FIG. 10 shows a table showing the corresponding output of a selector 823 and the input to a decoder 822.

The inputs to the decoder 822 include (a) the result of comparing of the portion corresponding to the lower 11-bit portion 203 and the lower 11 bits of the PC address 811 by a comparator 821 (0 if the portion corresponding to the lower 11-bit portion 203 is equal to or greater than the lower 11 bits of the PC address 811, and 1 if otherwise), (b) the portion corresponding to the bit 202 within the entry 714, and (c) the highest bit of the lower portion of the PC address 811. FIG. 10 shows the relationship between the input of the decoder 822 and the output of the selector 823.

The output of the comparator 821 is a carry bit carried from the 11th bit from the lowest bit to the 12th bit from the lowest bit of the 12-bit addition operation carried out in the instruction fetching processing. By performing an exclusive OR on (a) the carry bit, (b) the bit corresponding to bit 202 in entry 714, and (c) the 12th bit from the lowest bit of the PC address 811, it is possible to compute bit 202 within the instruction word 711, i.e. the sign bit of the displacement 204.

By calculating the sum of the above-mentioned three 1-bit values, i.e. the carry bit, the bit 202, and the 12th bit from the least significant bit of the PC address 811, the carry bit carried from the addition operation that has been carried out in the instruction fetching processing can be determined.

If the bit 202 is sign-extended to 20 bits, and those 20 bits, the upper 20-bit portion of the PC address 811, and the carry bit from the addition operation carried out in the instruction fetching processing is added, the branch target address 812 becomes equal to the value of the sum of the value obtained by sign extending the 12-bit disp to 32 bits and the PC address. However, another addition operation the same as the addition operation described above is conducted by (1) adding −1 to the upper 20 bits of the PC address 811 if bit 202 is 1, (2) adding +1 to the upper 20 bit of the PC address 811 if the carry bit from the most significant bit of the addition operation in the instruction fetching processing is 1; and (3) adding nothing to the upper 20 bits of the PC address 811 if the value of bit 202 and the carry bit from the addition operation in the instruction fetching processing is 00 or 11 (adding +1 if they are 01, and adding −1 if they are 10).

While the preferred embodiments of the present invention have been described, various changes may be made within the spirit and scope of the invention. For example, this invention may be practiced (1) not only for branch instructions but also for load/store instructions using PC+disp addressing, namely, any instructions using PC relative addressing mode, and (2) not just for a single disp width but also for a plurality of disp widths, such as 8 bits and 12 bits, in both the first and second embodiments.

The first advantage of the processor described in the first embodiment of the present invention is that it performs fast branch target address calculation during the execution of a PC+disp branch instruction, just as in execution of a semi-ABS branch instruction, thereby reducing the delay time for branch target address calculation. This enables a processor, especially one executing instructions in a pipeline, to reduce the time required in the branch target address calculation stage so as to increase the operation frequency of the processor and/or to reduce the number of processing cycles.

For example, in the first embodiment, where all addresses are 32 bits and the disp is 12 bits, while a 32-bit addition operation is required in the execution of a PC+disp branch instruction by the conventional PC+disp branch logic system, only a 21-bit addition operation is required by the PC+disp branch logic system of the first embodiment. If all addresses are 64 bits and the disp is 20 bits, a 64-bit addition operation is required by the conventional PC+disp logic system, while only a 45-bit addition operation is required in the first embodiment.

In addition, the processor described in the first embodiment has a second advantage that it speeds the overall operation of a PC+disp branch instruction by starting access to an instruction cache at an earlier time, as is the case with a SemiABS branch instruction.

Figure 9:
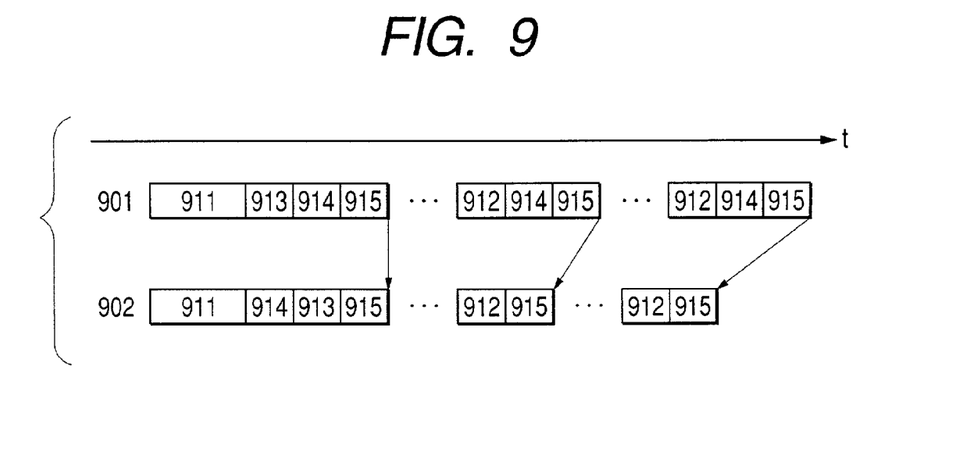
FIG. 9 shows a timing diagram showing a comparison between a conventional PC+disp branch logic system and the PC+disp branch logic system of the first embodiment.

The third advantage of the processor of the first embodiment is that when a certain PC+disp branch instruction hits the instruction cache and is repetitively executed, the calculation of the lower portion of the branch address is performed at the first execution time when the instruction is stored in the instruction cache, and consequently it does not have to be repetitively performed at the subsequent execution times. FIG. 9 is a timing diagram showing a comparison of execution in the conventional PC+disp branch logic system and in the PC+disp branch logic system of the first embodiment.

Reference number 901 indicates the conventional PC+disp branch logic system, reference numeral 911 indicates an instruction cache read-out operation and an operation of reading an instruction word from the main memory due to an instruction cache miss hit, reference numeral 913 indicates an operation of storing the instruction word that has been read out by operation 911, reference numeral 914 indicates the addition operation of the lower portion of the branch target address, and reference numeral 915 indicates the addition operation of the upper portion of the branch target address and the operation of reading a branch target address instruction from the instruction cache. Reference numeral 912 indicates a read-out operation for an instruction cache hit. Reference numeral 902 indicates operations in the PC+disp branch logic system of the first embodiment. If a certain PC+disp branch instruction is executed repetitively due to instruction cache hits, as the number of repetitions increases, the execution time is further reduced by the PC+disp branch logic system of the first embodiment than by the conventional PC+disp branch logic system.

The fourth advantage of the processor described in the first embodiment is that it benefits from the effects described in the first, second, and third advantages without making any modification to the instruction sets of processors supporting the existing PC+disp addressing.

The processor described in the second embodiment of the present invention performs a recalculation of the sign bit of a disp and the carry bit from the most significant bit of the addition result at instruction fetching time. Therefore, the second embodiment can not benefit as much from the first advantage as the first embodiment, but it benefits from the second, third, and fourth advantages as much as the first embodiment.

The processor described in the second embodiment has an additional advantage of requiring no extra storage areas in a cache or buffer where instruction words read from the main memory are stored.

The foregoing invention has been described in terms of preferred embodiments. However, those skilled in the art will recognize that many variations of such embodiments exist. Such variations are intended to be within the scope of the present invention and the appended claims.

What is claimed is:

1. A processor comprising:
    a storage circuit for temporarily storing an instruction word, from which the stored instruction word is read at an instruction execution time;
    a decoder for receiving the instruction word and for determining whether an effective address of said instruction word is specified as a PC relative displacement value;
    an adder for adding of the PC relative displacement value and predetermined lower bits of the PC address, and for outputting the calculating result outputted from said adder as a portion of the effective address if said instruction word has the PC relative displacement value;
    a selector for replacing the displacement value in the instruction word with the calculating result outputted from said adder, and for outputting said replaced result to said storage circuit as a semiABS displacement value of the instruction word, if said instruction word has the PC relative displacement value;
    an effective address calculator for calculating the effective address with the semiABS displacement value at the instruction execution time; and
    a carry bit recovering means for recovering the disregarded carry bit of said adder, including:
    a comparator for comparing the semiABS displacement value and lower bits of the PC address;
    a decoder for receiving the comparing result, a sign bit of the semiABS displacement value, and a bit which is a digit higher than the highest bit of the lower bits of the PC address in the PC address thereby outputting a selecting signal for selecting one of +1, 0, and −1 according to a predetermined conversion table; and
    means for adding +1, 0, or −1 to the rest bits of the PC address then to a upper portion of the effective address with a bit number equal to the rest bits of the PC address according to the selecting signal thereby deciding a recovered carry bit,
    wherein said effective address calculator calculates said effective address without using the carry bit generated by said adder.

2. The processor of claim 1, further comprising an effective address calculator for receiving a portion of the instruction word that has been stored in said storage circuit, for performing a sign bit extension thereof, and for calculating the effective address by using the semiABS displacement value at the instruction execution time.

3. The processor of claim 1, wherein said storage circuit includes an area for storing a carry bit from said adder corresponding to the instruction word.

4. The processor of claim 3, further comprising:
    an effective address calculator for receiving a portion of the instruction word that has been stored in said storage circuit, for performing a sign bit extension thereof, and for calculating the effective address with the semiABS displacement value at the instruction execution time,
    wherein said effective address calculator calculates said effective address with said sign bit extension by using the carry bit stored in said storage circuit.

5. The processor of claim 1, wherein said storage circuit is an instruction cache.

6. A method for recovering a disregarded carry bit generated during converting a first instruction word with a PC relative displacement value into a second instruction word with a semiABS displacement value comprising:
    calculating the semiABS displacement value by adding predetermined lower bits of a PC address and the PC relative displacement value;
    replacing the PC relative displacement value in the first instruction word with the calculating result;
    storing the second instruction word with the semiABS displacement value in a storage circuit;
    receiving a portion of the instruction word stored in said storage circuit;
    performing a sign bit extension without using a carry bit carried from the adding result;
    calculating the effective address with the semiABS displacement value at the instruction execution time;
    comparing the semiABS displacement value and lower bits of the PC address;
    receiving the comparing result, a sign bit of the semiABS displacement value, and a bit which is a digit higher than the highest hit of the lower bits of the PC address in the PC address thereby outputting a selecting signal for selecting one of +1, 0, and −1 according to a predetermined conversion table; and
    adding +1, 0, or to the rest bits of the PC address then to a upper portion of the effective address with a bit number equal to the rest bits of the PC address according to the selecting signal thereby recovering a carry bit carried from the most significant bit of the add step,
    whereby the semiABS displacement value stored in said storage circuit is then immediately used as a portion of an effective address at the instruction execution time.

7. A method for recovering a disregarded carry bit generated during converting a first instruction word with a PC relative displacement value into a second instruction word with a semiABS displacement value comprising:
    calculating the semiABS displacement value by adding predetermined lower bits of a PC address and the PC relative displacement value;
    replacing the PC relative displacement value in the first instruction word with the calculating result;
    storing the second instruction word with the semiABS displacement value in a storage circuit;

receiving a portion of the instruction word stored in said storage circuit;

performing a sign bit extension without using a carry bit carried from the adding result;

calculating the effective address with the semiABS displacement value at the instruction execution time;

comparing the semiABS displacement value and lower bits of the PC address to obtain a carry bit carried from the adding step;

performing an exclusive OR operation on the carry bit, a sign bit of the semiABS displacement value, and the bit which is a digit higher than the highest hit of the lower bits of the PC address in the PC address thereby outputting a sign bit of the PC relative displacement value of the first instruction word; and adding the carry bit, the sign bit, and the bit which is a digit higher than the highest hit of the lower bits of the PC address in the PC address to recover a carry bit carried from the adding step, whereby the semiABS displacement value stored in said storage circuit is then immediately used as a portion of an effective address at the instruction execution time.

* * * * *